(12) United States Patent
Oishi

(10) Patent No.: US 10,122,197 B2
(45) Date of Patent: Nov. 6, 2018

(54) CONTROLLING A DISPLAY BASED ON DIFFERENT MODES OF OPERATION

(75) Inventor: Takashi Oishi, Tokyo (JP)

(73) Assignee: Sony Corporation, Minato-ku, Tokyo (JP)

( * ) Notice: Subject to any disclaimer, the term of this patent is extended or adjusted under 35 U.S.C. 154(b) by 196 days.

(21) Appl. No.: 14/348,934

(22) PCT Filed: Sep. 6, 2012

(86) PCT No.: PCT/JP2012/072808
§ 371 (c)(1),
(2), (4) Date: Apr. 1, 2014

(87) PCT Pub. No.: WO2013/073267
PCT Pub. Date: May 23, 2013

(65) Prior Publication Data
US 2014/0245036 A1    Aug. 28, 2014

(30) Foreign Application Priority Data

Nov. 18, 2011    (JP) .................................. 2011-252829

(51) Int. Cl.
*G06F 1/28*    (2006.01)
*H02J 7/00*    (2006.01)
(Continued)

(52) U.S. Cl.
CPC ............... *H02J 7/007* (2013.01); *G06F 1/28* (2013.01); *H01M 10/44* (2013.01);
(Continued)

(58) Field of Classification Search
CPC . H02J 7/007; H02J 7/0068; H01M 2010/4278
(Continued)

(56) References Cited

U.S. PATENT DOCUMENTS

| 6,011,323 A | * | 1/2000 | Camp | ................... | H02J 7/0063 |
| | | | | | 307/126 |
| 6,275,007 B1 | * | 8/2001 | Tokuyama | ............ | H02J 7/0068 |
| | | | | | 320/130 |

(Continued)

FOREIGN PATENT DOCUMENTS

| JP | 2000-029544 A | 1/2000 |
| JP | 2004-151908 A | 5/2004 |

(Continued)

OTHER PUBLICATIONS

International Search Report dated Nov. 13, 2012 in PCT/JP2012/072808.

*Primary Examiner* — Mark Connolly
(74) *Attorney, Agent, or Firm* — Chip Law Group

(57) ABSTRACT

An electronic apparatus is provided with a processing unit that has a first operation mode in which an operation is enabled using only external power from a feeding device and a second operation mode in which the operation is enabled by feeding from a battery in addition to the external power from the feeding device. When the remaining capacity of the battery is sufficient, the processing unit executes an apparatus operation in the second operation mode. However, when the remaining capacity of the battery decreases, the processing unit changes an operation mode to the first operation mode and executes charging of the battery while continuously executing the apparatus operation.

11 Claims, 10 Drawing Sheets

(51) Int. Cl.
    *H02J 50/10*    (2016.01)
    *H02J 50/80*    (2016.01)
    *H01M 10/44*    (2006.01)
    *H04B 5/00*     (2006.01)
    *H02J 7/02*     (2016.01)
    *H01M 10/42*    (2006.01)

(52) U.S. Cl.
    CPC ............ *H02J 7/0068* (2013.01); *H02J 7/025* (2013.01); *H02J 50/10* (2016.02); *H02J 50/80* (2016.02); *H04B 5/0031* (2013.01); *H04B 5/0037* (2013.01); *H01M 2010/4278* (2013.01); *H02J 7/0052* (2013.01); *H02J 2007/005* (2013.01); *H02J 2007/0062* (2013.01); *H02J 2007/0096* (2013.01); *H04B 5/0081* (2013.01); *Y02B 40/90* (2013.01)

(58) Field of Classification Search
    USPC .......................................................... 713/300
    See application file for complete search history.

(56) References Cited

U.S. PATENT DOCUMENTS

| | | | | |
|---|---|---|---|---|
| 6,357,011 B2* | 3/2002 | Gilbert | ............... | G06F 1/266 713/300 |
| 6,526,515 B1* | 2/2003 | Charles | ............... | G06F 1/266 713/300 |
| 7,065,658 B1* | 6/2006 | Baraban | ............... | G06F 1/1626 713/300 |
| 7,528,577 B2* | 5/2009 | Hara | ............... | G06F 1/3203 320/132 |
| 8,793,518 B2* | 7/2014 | Reddy | ............... | G06F 1/3212 320/128 |
| 2001/0003205 A1* | 6/2001 | Gilbert | ............... | G06F 1/266 713/320 |
| 2003/0088798 A1 | 5/2003 | Ono et al. | | |
| 2004/0172527 A1 | 9/2004 | Ono et al. | | |
| 2006/0023071 A1 | 2/2006 | Mori et al. | | |
| 2006/0085653 A1* | 4/2006 | Bollinger | ............... | G06F 1/3203 713/300 |
| 2008/0179957 A1* | 7/2008 | Tsui | ............... | H02J 7/0013 307/66 |
| 2010/0123435 A1* | 5/2010 | Piazza | ............... | H02J 7/0063 320/128 |
| 2010/0146308 A1* | 6/2010 | Gioscia | ............... | G06F 1/1632 713/300 |
| 2010/0246857 A1 | 9/2010 | Kajita | | |
| 2011/0320405 A1* | 12/2011 | Hsu | ............... | G06F 1/1632 707/634 |
| 2012/0222092 A1* | 8/2012 | Rabii | ............... | H04N 21/41407 726/4 |
| 2014/0108846 A1* | 4/2014 | Berke | ............... | G06F 1/263 713/340 |

FOREIGN PATENT DOCUMENTS

| | | |
|---|---|---|
| JP | 2004-213392 A | 7/2004 |
| JP | 2006-042000 A | 2/2006 |
| JP | 2010-130242 A | 6/2010 |
| JP | 2010-287115 A | 12/2010 |
| WO | WO 2009/041717 A1 | 4/2009 |

* cited by examiner

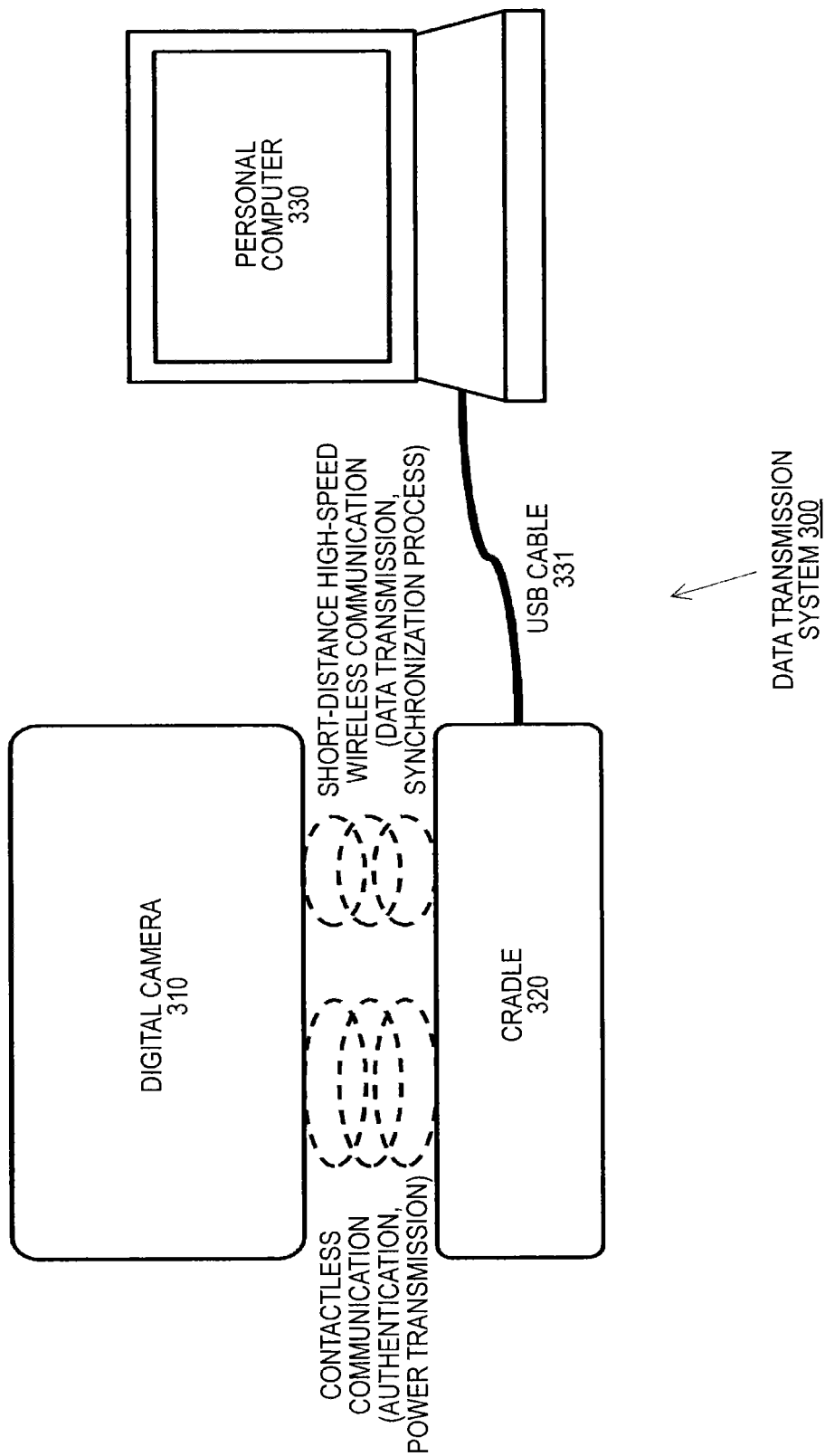

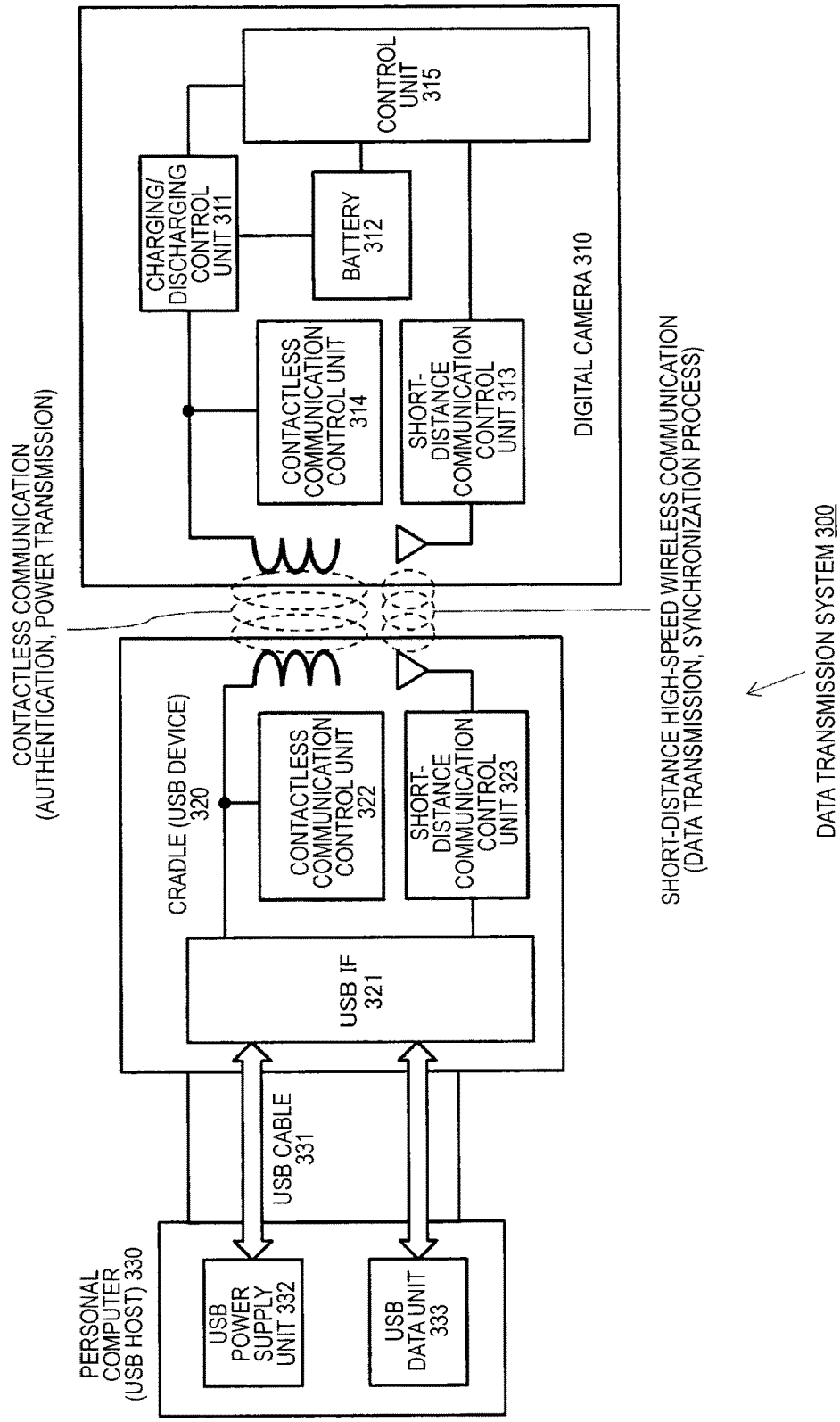

CONTROLLING A DISPLAY BASED ON DIFFERENT MODES OF OPERATION

TECHNICAL FIELD

The technology disclosed in the present specification relates to an electronic apparatus capable of operating by a battery, a charging control method, and a data transmission system and particularly, to an electronic apparatus capable of executing an apparatus operation and charging of a battery at the same time, a charging control method, and a data transmission system.

BACKGROUND ART

Recently, portable apparatuses such as a digital camera, a mobile phone, a tablet terminal, and a notebook computer spread broadly. Most of these kinds of apparatuses are driven by a battery.

When a second battery is used as the battery, the battery can be used repetitively by charging. When the battery is charged, power supplied from a commercial power supply or a charger is used. In a large number of apparatuses driven by the battery, "operation charging" in which the battery is charged while an apparatus body is operated in a state in which the apparatus is connected to the commercial power supply or the charger is enabled. During the operation charging, generally, surplus power obtained by subtracting consumption power necessary for an apparatus operation from the supplied power is used for charging the battery. In addition, during the operation charging, the power necessary for the apparatus operation is used preferentially from an external power supply such as the commercial power supply and is not supplied from the battery.

Methods of feeding power to the apparatus driven by the battery are various. In recent years, "universal serial bus (USB) feeding" to supply power through a USB cable has increased. For example, an electronic still camera in which a digital camera and a personal computer are connected by the USB cable and transmission of image data and charging of the battery are executed at the same time through the USB cable has been suggested (for example, refer to Patent Document 1). However, depending on a connection destination of a USB port, the maximum current standard may be as low as 500 mA. In this case, because only an amount obtained by subtracting a current value necessary for the apparatus operation is allocated to the charging, charging efficiency is not good (for example, refer to Patent Document 2). That is, the operation charging has a problem in that sufficient charging of the battery cannot be executed for consumption of the power by the apparatus operation.

In addition, during the apparatus operation, appropriate power supply may be necessary. For example, the appropriate power supply may be necessary during an imaging operation in the digital camera or a transmission operation of image data for an external apparatus such as a personal computer. In a state in which the battery is drained, the apparatus operation should be executed using only the feeding power. However, when the maximum current standard is low as in the USB feeding, a current necessary for the transmission operation of the image data may not be obtained. In this case, the data transmission should be started after the charging of the battery is executed.

In addition, in the digital camera, an operation such as driving of a lens barrel also needs large power more than a predetermined rating of the USB cable. For this reason, an electronic apparatus such as the digital camera in which, when it is confirmed that necessary power cannot be supplied from the charging battery, the necessary power is supplied from the charging battery after the charging is executed has been suggested (for example, refer to Patent Document 3).

As such, depending on the remaining capacity of the battery, the apparatus operation that is enabled during the charging is restricted. The apparatus operation is restricted until the battery is charged, regardless of a power supply being connected. Therefore, usability is not good.

For example, a wireless communication apparatus in which, if the remaining battery capacity decreases at the time of wireless communication using the battery, a transmission output level is decreased, power consumption is suppressed, and a communication time is increased has been suggested (for example, refer to Patent Document 4). However, in the wireless communication apparatus, if charging efficiency of the battery at the time of the operation charging is not improved, a problem of the restriction of the apparatus operation cannot be resolved in a state in which the operation charging is enabled.

CITATION LIST

Patent Documents

Patent Document 1: JP 2002-237971 A
Patent Document 2: JP 2007-214683 A, paragraph 0007
Patent Document 3: JP 2011-19369 A
Patent Document 4: JP 2011-176575 A

SUMMARY OF THE INVENTION

Problems to be Solved by the Invention

An object of the technology disclosed in the present specification is to provide a superior electronic apparatus capable of efficiently charging a battery while continuously executing an apparatus operation, using external feeding power in which the maximum current standard is suppressed low, a charging control method, and a data transmission system.

Another object of the technology disclosed in the present specification is to provide a superior electronic apparatus capable of appropriately executing an apparatus operation while maintaining charging efficiency of a battery, even in a state in which the remaining capacity of the battery is decreased, a charging control method, and a data transmission system.

Solutions to Problems

The present application is made by considering the above-described problems, the technology described in first aspect is an electronic apparatus including:

a battery;

a processing unit that executes an apparatus operation; and a charging/discharging control unit that controls feeding to the processing unit and charging of the battery using external power and feeding from the battery to the processing unit, wherein the processing unit has a first operation mode in which the apparatus operation is executed using power equal to or less than the external power and a second operation mode in which the apparatus operation is executed using power more than the external power, an operation mode of the processing unit is switched into the first operation mode or the second operation mode according to the remaining capacity of the battery, and the apparatus operation is executed.

According to the technology described in second aspect of the present application, the charging/discharging control unit of the electronic apparatus according to the first aspect supplies the external power preferentially to the processing unit and executes the charging of the battery using surplus power.

According to the technology described in third aspect of the present application, the electronic apparatus according to the first aspect is configured such that, when the processing unit executes the apparatus operation in the first operation mode, the charging/discharging control unit supplies the power more than the external power from the battery to the processing unit.

According to the technology described in fourth aspect of the present application, the electronic apparatus according to the first aspect is configured such that, when the processing unit executes the apparatus operation in the second operation mode, the charging/discharging control unit supplies the power more than the external power from the battery to the processing unit.

According to the technology described in fifth aspect of the present application, the electronic apparatus according to the first aspect is configured such that, when the remaining capacity of the battery is large, the processing unit executes the apparatus operation in the second operation mode, and when the remaining capacity of the battery is small, the processing unit executes the apparatus operation in the first operation mode.

According to the technology described in sixth aspect of the present application, the electronic apparatus according to the first aspect is configured such that, when the remaining capacity of the battery is large, the processing unit executes the apparatus operation in the second operation mode, and when the remaining capacity of the battery is small, the processing unit executes the apparatus operation in the first operation mode.

According to the technology described in seventh aspect of the present application, the electronic apparatus according to the first aspect is configured such that the external power is supplied from a cradle USB-connected to a USB host.

According to the technology described in eighth aspect of the present application, the electronic apparatus according to the first aspect is configured such that the processing unit executes communication with a communication partner other than the apparatus using short-distance high-speed wireless communication of a weak UWB method.

According to the technology described in ninth aspect of the present application, the processing unit of the electronic apparatus according to the eighth aspect is configured such that the processing unit sets a duty of a section, in which data transmission is actually executed in a time in which the short-distance high-speed wireless communication is enabled, to be low in the first operation mode and sets the duty to be higher than the duty of the first operation mode in the second operation mode.

Further, the technology described in tenth aspect of the present application is a charging control method, including:

a remaining capacity detection step of detecting the remaining capacity of a battery in an electronic apparatus to which external power is supplied;

a second apparatus operation step of executing an apparatus operation by a second operation mode in which power more than the external power is consumed, using the external power and discharging power of the battery in the electronic apparatus, when the remaining capacity of the battery is equal to or more than a first threshold value; and a first apparatus operation step of executing an apparatus operation by a first operation mode in which power equal to or less than the external power is consumed, in the electronic apparatus, when the remaining capacity of the battery is less than the first threshold value.

The technology described in eleventh aspect of the present application is the charging control method according to the tenth aspect, further including:

a charging step of charging the battery using surplus power of the external power, when the apparatus operation by the first operation mode is executed in the electronic apparatus; and an operation mode change step of switching the apparatus operation of the electronic apparatus into the second operation mode, in response to that the remaining capacity of the battery has become a second threshold value or more while the apparatus operation by the first operation mode is executed in the electronic apparatus.

Further, the technology described in twelfth aspect of the present application is a charging system, including:

an electronic apparatus; and a feeding device that supplies power to the electronic apparatus, wherein the electronic apparatus includes a battery and a processing unit having a first operation mode in which an apparatus operation is executed using power equal to or less than external power supplied from the feeding device and a second operation mode in which the apparatus operation consuming power more than the external power is executed and the electronic apparatus switches an operation mode of the processing unit into the first operation mode or the second operation mode according to the remaining capacity of the battery and executes the apparatus operation.

However, the "system" mentioned herein means a logical aggregate structure of a plurality of devices (or functional modules for realizing specific functions) and is not limited to a structure in which the individual devices or functional modules are in a single casing (hereinafter, the same as the above).

Further, according to the technology described in thirteenth aspect of the present application is a data transmission system, including:

an electronic apparatus; and a cradle on which the electronic apparatus is arranged and which is USB-connected, wherein the cradle transmits power obtained via a USB cable to the electronic apparatus by contactless communication, and the electronic apparatus includes a battery and a short-distance communication control unit having a first operation mode in which a data transmission operation of a low duty is executed using power equal to or less than external power supplied from the cradle and a second operation mode in which power more than the external power is consumed and the data transmission operation of a high duty is executed and the electronic apparatus switches an operation mode of the processing unit into the first operation mode or the second operation mode according to the remaining capacity of the battery and executes a short-distance high-speed wireless communication operation.

Effects of the Invention

According to the technology disclosed in the present specification, a superior electronic apparatus capable of efficiently charging a battery while continuously executing an apparatus operation, using external feeding power in which the maximum current standard is suppressed low, a charging control method, and a data transmission system can be provided.

In addition, according to the technology disclosed in the present specification, a superior electronic apparatus capable of appropriately executing an apparatus operation while maintaining charging efficiency of a battery, even in a state in which the remaining capacity of the battery is decreased, a charging control method, and a data transmission system can be provided.

In addition, according to the technology disclosed in the present specification, a superior electronic apparatus capable of executing an apparatus operation in which power is insufficient when only external feeding power is used, using discharging power from a battery, a charging control method, and a data transmission system can be provided.

Other objects, features, and advantages of the technology disclosed in the present specification will become apparent from the following detailed description based on embodiments to be described later and the accompanying drawings.

BRIEF DESCRIPTION OF DRAWINGS

FIG. 3 is a diagram illustrating a specific configuration example of a data transmission system 300 to which the technology disclosed in the present specification is applied.

FIG. 4 is a diagram schematically illustrating internal configurations of a digital camera 310, a cradle 320, and a personal computer 330.

MODE FOR CARRYING OUT THE INVENTION

Hereinafter, embodiments of the technology disclosed in the present specification will be described in detail with reference to the drawings.

Figure 1:
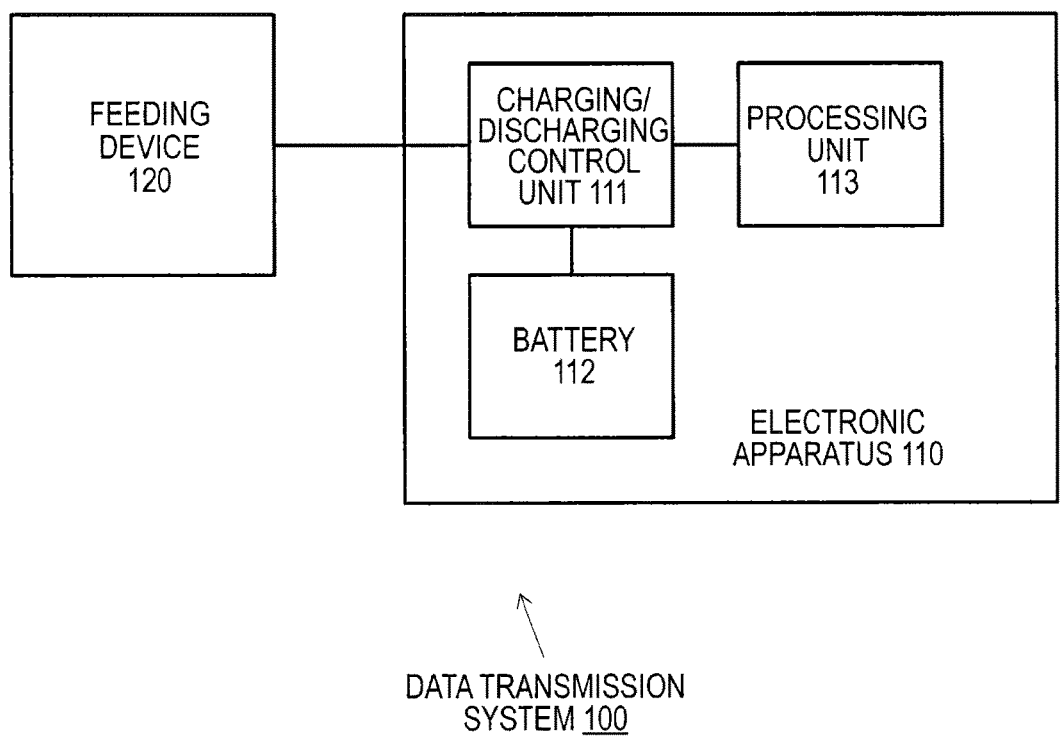
FIG. 1 is a diagram schematically illustrating a configuration of a data transmission system 100 to which the technology disclosed in the present specification is applied.

FIG. 1 schematically illustrates a configuration of a data transmission system 100 to which the technology disclosed in the present specification is applied. The data transmission system 100 illustrated in the drawing includes an electronic apparatus 110 and a feeding device 120 to externally supply power to the electronic apparatus 110.

The feeding device 120 may obtain feeding power using a commercial power supply as a power supply, and may obtain feeding power from a USB host (not illustrated in the drawings) such as a personal computer. Also, it is assumed that the feeding device functions as a cradle to be USB-connected and obtains the feeding power from the USB host. When the feeding device 120 obtains the feeding power from the USB host, a maximum current that can be supplied to the electronic apparatus 110 depends on the connection destination of a USB port and the current may be made to flow to 1.5 A or only the current of 500 mA may be made to flow.

For example, when the electronic apparatus 110 is a digital camera, a mobile phone, or a portable music reproduction apparatus and the feeding device 120 is the cradle as described above, it is assumed that the electronic apparatus 110 executes communication (synchronization process and like) with the USB host (not illustrated in the drawings) such as the personal computer via the cradle.

The electronic apparatus 110 includes a processing unit 113 to execute an apparatus operation, a battery 112, and a charging/discharging control unit 111 as illustrated in the drawings.

The charging/discharging control unit 111 controls supplying of external power from the feeding device 120 to the processing unit 113, charging of the battery 112, and discharging of the battery 112. Basically, the charging/discharging control unit 111 preferentially supplies the external power from the feeding device 120 to the processing unit 113 and charges the battery 112 using surplus power. In addition, the charging/discharging control unit 111 controls the discharging of the battery 112, that is, feeding from the battery 112 to the processing unit 113 while monitoring the remaining capacity of the battery 112.

In this embodiment, it is assumed that feeding to the processing unit 113 is insufficient when only the external power from the feeding device 120 is used. For example, when feeding of the external power from the feeding device 120 is executed by contactless communication (to be described below), feeding efficiency is as low as about 50%. For this reason, it is assumed that power necessary for the apparatus operation is insufficient when only the external power is used. In addition, when the feeding device 120 is, for example, the cradle, the maximum current standard being low depending on the connection destination of the USB port may cause power insufficiency. Therefore, in both the case in which the feeding device 120 is not connected to the electronic apparatus 110 and the case in which the feeding device 120 is connected to the electronic apparatus 110, when feeding to the processing unit 113 using only the external power from the feeding device 120 is insufficient, the charging/discharging control unit 111 executes feeding from the battery 112 to the processing unit 113.

For example, the charging/discharging control unit 111 can measure an output voltage of the battery 112 and acquire the remaining capacity thereof. However, the remaining capacity can be calculated from an integration value of a charging/discharging current. Hereinafter, it is assumed that the charging/discharging control unit 111 monitors the remaining capacity of the battery 112 from the output voltage, for simplification of the description.

The apparatus operation that is executed by the processing unit 113 includes a communication operation with an external apparatus (including a communication operation with the USB host via the cradle), an imaging operation or a reproduction operation of an imaging image (when the electronic apparatus 110 is the digital camera), and a display operation (when the electronic apparatus 110 includes a display panel). When the connection destination of the USB port flows a current of 1.5 A, the apparatus operation can be executed. However, when the connection destination flows only 500 mA, the apparatus operation cannot be executed.

In this embodiment, the processing unit 113 is configured to execute the apparatus operation in a plurality of operation modes having different consumption power and switch the operation mode on the basis of the remaining capacity of the battery 112. That is, when the remaining capacity of the battery 112 is high, the processing unit 113 executes the apparatus operation in an operation mode in which consumption power is high, but performance is high. However, when the remaining capacity of the battery 112 decreases, the processing unit 113 changes the operation mode to an operation mode in which the consumption power is low while suppressing the performance and executes charging of the battery 112 during the apparatus operation to restore the remaining capacity.

For example, the processing unit 113 includes a first operation mode in which an operation is enabled using only the external power from the feeding device 120 and a second operation mode in which power more than the external power from the feeding device 120 is used for the apparatus operation. In the second operation mode, the processing unit 113 can execute the operation by feeding from the battery 112 in addition to the external power from the feeding device 120. When the feeding device 120 is the cradle and the connection destination of the USB port flows a current of 1.5 A, the processing unit 113 can execute the apparatus operation in the second operation mode, by the power supplied from the cradle. However, when the connection destination of the USB port flows only a current of 500 mA, the processing unit 113 cannot execute the apparatus operation in the second operation mode, by only the power supplied from the cradle.

In the first operation mode, the processing unit 113 suppresses the performance of the apparatus operation to decrease the consumption power. The charging of the battery 112 can be executed by surplus power obtained by subtracting the power consumed by the processing unit 113 from the external power from the feeding device 120. Meanwhile, in the second operation mode, the processing unit 113 can upgrade the performance of the apparatus operation. However, the processing unit 113 may consume the power to the capacity of the battery 112. In other words, the charging of the battery 112 cannot be executed in the second operation mode and the processing unit 113 cannot execute the apparatus operation continuously in the second operation mode in a state in which the remaining capacity of the battery 112 is small.

Here, when the apparatus operation executed by the processing unit 113 is a communication operation (a synchronization process and the like) with the feeding device 120 functioning as the cradle, the first operation mode corresponds to a transmission operation in which the performance has been degraded and the second operation mode corresponds to a transmission operation in which the performance has been upgraded. When the apparatus operation executed by the processing unit 113 is a wireless communication operation in a wireless network, the first operation mode corresponds to a communication operation in which transmission power has been suppressed and the second operation mode corresponds to a communication operation in which the transmission power has been increased. When the electronic apparatus 110 is the digital camera, only reproduction of an imaging image is allowed in the first operation mode and an imaging operation as well as the image reproduction is allowed in the second operation mode. When the electronic apparatus 110 includes the display panel, the first operation mode corresponds to a display operation in which brightness of the display panel has been suppressed and the second operation mode corresponds to an operation in which display and an output have been executed with the display panel of high brightness. When the electronic apparatus 110 has a global positioning system (GPS) function mounted therein, the first operation mode corresponds to the case in which degradation of positioning performance of a position is allowed and the GPS function is intermittently operated and the second operation mode corresponds to the case in which the GPS function is fully operated and the positioning performance of the position is upgraded.

When the remaining capacity of the battery 112 is sufficient, the processing unit 113 executes the apparatus operation in the second operation mode. However, when the remaining capacity of the battery 112 decreases, the processing unit 113 changes the operation mode to the first operation mode and continuously executes the apparatus operation while suppressing the performance. At the same time, the processing unit 113 executes the charging of the battery 112 and restores the remaining capacity.

Therefore, even though the maximum current standard of the external power from the feeding device 120 is suppressed low, the electronic apparatus 110 can efficiently execute the charging of the battery 112 while continuously executing the apparatus operation. In addition, when the remaining capacity of the battery 112 is sufficient, the electronic apparatus 110 can execute the apparatus operation in which power is insufficient when only the external power from the feeding device 120 is used, by additionally using discharging power from the battery 112.

Figure 2:
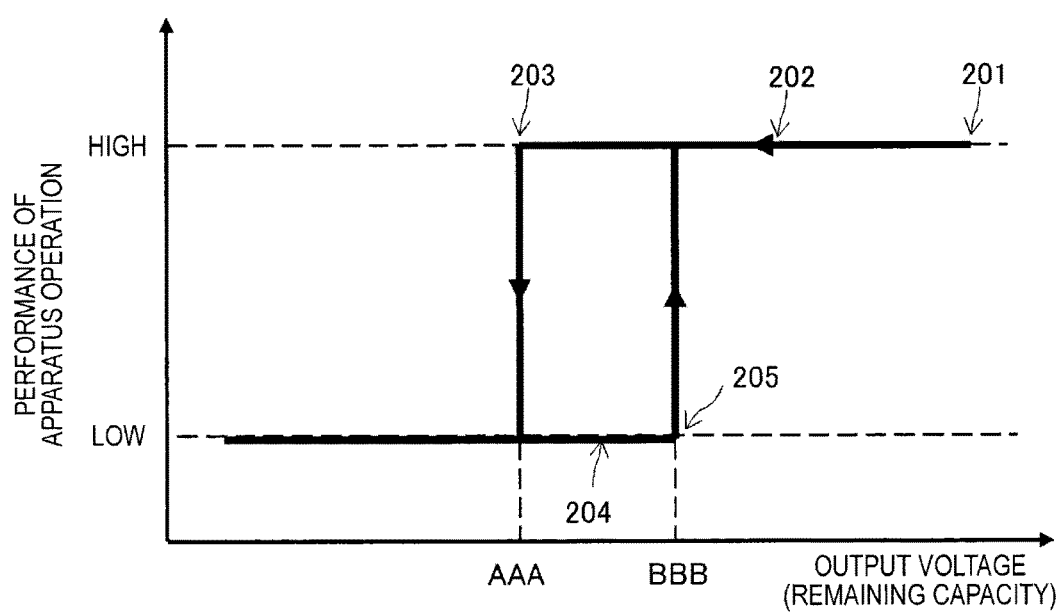
FIG. 2 is a diagram illustrating a charging/discharging characteristic of a battery 112 when an operation mode is switched according to the remaining capacity of the battery 112 and an apparatus operation is executed.

FIG. 2 illustrates a charging/discharging characteristic of the battery 112 when the processing unit 113 switches the operation mode according to the remaining capacity of the battery 112 and executes the apparatus operation. However, it is assumed that the remaining capacity is measured on the basis of the output voltage of the battery 112.

In a state in which the battery 112 is almost fully charged and the output voltage is sufficiently high, the processing unit 113 starts the apparatus operation in the second operation mode (reference number 201).

In the second operation mode, the performance of the processing unit 113 is high, but the processing unit 113 executes the operation by feeding from the battery 112 in addition to the external power from the feeding device 120. For this reason, the remaining capacity of the battery 112 gradually decreases. As a result, the output voltage also decreases (reference number 202).

In the second operation mode, the charging of the battery 112 cannot be executed and the processing unit 113 cannot continuously execute the apparatus operation in the second operation mode in a state in which the remaining capacity of the battery 112 is small. Therefore, if the output voltage of the battery 112 is less than a first threshold value AAA, the processing unit 113 switches the operation mode from the second operation mode to the first operation mode (reference number 203).

In the first operation mode, the processing unit 113 suppresses the performance of the apparatus operation to decrease consumption power. Because the charging of the battery 112 is executed by the surplus power obtained by subtracting the power consumed by the processing unit 113 from the external power from the feeding device 120, the remaining capacity of the battery 112 gradually increases. As a result, the output voltage also increases (reference number 204).

In addition, if the output voltage of the battery 112 is more than a second threshold value BBB, it can be known that the remaining capacity has been sufficiently restored. Therefore, the processing unit 113 returns the operation mode to the second operation mode and executes the apparatus operation with the original high performance (reference number 205). When the processing unit 113 changes the operation mode to the second operation mode, supplying of the charging current of the battery 112 is also stopped.

In an example illustrated in FIG. 2, the first threshold value AAA when the processing unit 113 changes the operation mode from the second operation mode to the first operation mode is smaller than the second threshold value BBB when the processing unit 113 changes the operation mode from the first operation mode to the second operation mode (AAA<BBB). The reason why the first threshold value AAA and the second threshold value BBB are set differently and hysteresis characteristics are generated as illustrated in the drawing is to prevent the operation from becoming unstable due to switching of the operation mode of the processing unit 113 generated frequently by the measurement error of the output voltage of the battery 112.

When the processing unit 113 needs to be operated in the second operation mode over a longer period or a smaller remaining capacity of the battery 112 is allowed, the first threshold value AAA may be set to a smaller value. In contrast, when the remaining capacity of the battery 112 does not need to be set low, the first threshold value AAA may be set to a larger value. When the remaining capacity of the battery 112 needs to be restored until a state in which the battery 112 is almost fully charged, the second threshold value BBB may be set to a larger value and when the remaining capacity of the battery 112 is not severely required, the second threshold value BBB may be set to a smaller value.

FIG. 3 illustrates a specific configuration example of a data transmission system 300 to which the technology disclosed in the present specification is applied. The data transmission system 300 illustrated in the drawing includes a digital camera 310 that corresponds to an electronic apparatus, a personal computer 330 that manages image data imaged by the digital camera 310, and a cradle 320 that functions as a feeding device connected to the personal computer 330 functioning as a USB host by a USB cable 331.

The digital camera 310 is connected contactlessly to the cradle 320. Therefore, the digital camera 310 arranged on the cradle 320 functions as a USB device and can execute data transmission through the USB cable 331 and execute a synchronization process between the personal computer 330 and the digital camera. In addition, the cradle 320 transmits power supplied through a VBUS terminal of the USB cable 331 to the digital camera 310 contactlessly.

In this embodiment, two communication mechanism of contactless communication of an electromagnetic induction method and short-distance high-speed wireless communication of a weak ultra wide band (UWB) method using a low band (4 GHz band) of an UWB are used between the digital camera 310 and the cradle 320. In the contactless communication, for example, the RFID standard of which specifications have been settled by near field communication (NFC) can be applied. In addition, in the short-distance high-speed wireless communication of the weak UWB method, for example, "Transfer Jet" is used. With respect to the details of the short-distance high-speed wireless communication, for example, Japanese Patent No. 4345849 already transferred to the present applicant or www.transferjet.org/index.html (as of Nov. 7, 2011) may be referred to. In addition to execution of an authentication process between the digital camera 310 and the cradle 320 using the contactless communication, power can be transmitted from the cradle 320 to the digital camera 310. In addition, data transmission (a synchronization process between the digital camera 310 and the personal computer 330 via the cradle 320) can be executed between the digital camera 310 and the cradle 320 using the short-distance high-speed wireless communication.

When the personal computer 330 is driven by the battery, if a current flowing to the VBUS terminal of the USB cable 331 is suppressed or the maximum current standard is decreased as 500 mA due to other reasons, power that can be supplied from the cradle 320 to the digital camera 310 also decreases. For this reason, at the side of the digital camera 310, the external power supplied from the personal computer 330 via the cradle 320 is not sufficient. Also, there is an apparatus operation of the digital camera 310 in which power is insufficient when only the external power from the cradle 320 is used.

FIG. 4 schematically illustrates internal configurations of the digital camera 310, the cradle 320, and the personal computer 330. In the same drawing, functions of supplying power to the digital camera 310 and data transmission between the digital camera 310 and the personal computer 330 are mainly specialized and illustrated.

The cradle 320 includes a USB interface 321, a contactless communication control unit 322, and a short-distance communication control unit 323. The contactless communication control unit 322 is connected to the side of the digital camera 310 using an electromagnetic induction action of a coil, for example, by the NFC method. The contactless communication control unit 322 executes communication for the authentication process and transmits the external power received from a USB power supply unit 332 of the personal computer 330 by the USB interface 321 to the digital camera 310. In addition, the short-distance communication control unit 323 executes high-speed data transmission between the digital camera 310 and the short-distance communication control unit, for example, by the weak UWB method. Data such as an image received by the short-distance communication control unit 323 is transmitted from the USB interface 321 to a USB data unit 333 of the side of the personal computer 330.

When the personal computer 330 is driven by the battery like a notebook computer, the maximum current standard that is flown from the USB power supply unit 332 to the VBUS terminal of the USB cable 331 decreases as 500 mA and power that can be supplied from the cradle 320 to the digital camera 310 also decreases. For this reason, at the side of the digital camera 310, the external power supplied from the personal computer 330 via the cradle 320 is not sufficient.

The digital camera 310 includes a contactless communication control unit 314, a short-distance communication control unit 313, a charging/discharging control unit 311, a battery 312, and a control unit 315. In order to simplify the drawings, illustrations of an imaging optical system and a processing block of an imaging image are omitted.

The contactless communication control unit 314 is connected to the cradle 320 using the electromagnetic induction action of the coil, for example, by the NFC method. The contactless communication control unit 314 executes communication for the authentication process and receives the external power from the cradle 320. In addition, the short-distance communication control unit 313 executes short-distance high-speed wireless communication between the cradle 320 and the short-distance communication control unit, for example, by the weak UWB method.

The charging/discharging control unit 311 controls supplying of the external power from the cradle 320 to the individual units 313 to 315, charging of the battery 312, and discharging of the battery 312, according to an instruction from the control unit 315. Basically, the external power from the cradle 320 is used preferentially for feeding to the individual units 313 to 315 and surplus power thereof is used for charging the battery 312. In addition, the control unit 315 controls the charging of the battery 312, that is, the feeding from the battery 312 to the individual units 313 to 315 while monitoring the remaining capacity of the battery 312. The control unit 315 can measure the output voltage of the battery 312 and acquire the remaining capacity thereof.

In this embodiment, it is assumed that feeding to the individual units 313 to 315 is insufficient when only the external power supplied from the cradle 320 by the contactless communication is used. This is because it is assumed that the maximum current standard is low depending on the connection destination of the USB port of the cradle 320 and power necessary for the apparatus operation is insufficient when only the external power is used. Therefore, in the case in which the digital camera 310 is arranged on the cradle 320 as well as the case in which the digital camera 310 is separated from the cradle 320, when feeding to the individual units 313 to 315 using only the external power supplied from the cradle 320 by the contactless communication is insufficient, feeding from the battery 312 to the individual units 313 to 315 is also executed. As an example of the case in which feeding by the external power is insufficient, the case in which the short-distance high-speed wireless communication is executed by the short-distance communication control unit 313 is exemplified.

For example, in the short-distance communication control unit 313, when the short-distance high-speed wireless communication using the weak UWB method is executed with a duty more than a predetermined duty, the communication operation cannot be executed using only the external power supplied from the cradle 320 by the contactless communication. Therefore, the charging/discharging control unit 311 supplies power from the battery 312 to the short-distance communication control unit 313 and the like.

Meanwhile, in the short-distance communication control unit 313, when the short-distance high-speed wireless communication using the weak UWB method is executed with a duty equal to or less than the predetermined duty, the communication operation can be executed sufficiently using only the external power supplied from the cradle 320 by the contactless communication. In this case, the charging/discharging control unit 311 uses the surplus power of the external power for charging the battery 312.

The digital camera 310 defines a plurality of operation modes in which duty ratios of the short-distance high-speed wireless communication in the short-distance communication control unit 313 are different from each other. Because entire consumption power of the device becomes different according to the duty ratio, the operation mode is switched on the basis of the remaining capacity of the battery 312, so that the surplus power can be obtained during the short-distance high-speed wireless communication and the battery 312 can be charged.

For example, a first operation mode in which the short-distance communication control unit 313 executes a communication operation with a duty of 10%, such that the short-distance high-speed wireless communication is enabled sufficiently using only the external power supplied from the cradle 320 by the contactless communication, and a second operation mode in which the short-distance communication control unit 313 executes the communication operation with the duty of 100% by feeding from the battery 112 in addition to the external power supplied from the cradle 320 by the contactless communication are defined.

In the first operation mode, the consumption power is decreased by suppressing the performance of the communication operation in the short-distance communication control unit 313. The charging/discharging control unit 311 can charge the battery 312 by the surplus power obtained by subtracting the power consumed by the short-distance communication control unit 313 from the external power supplied from the cradle 320 by the contactless communication.

Figure 5A:
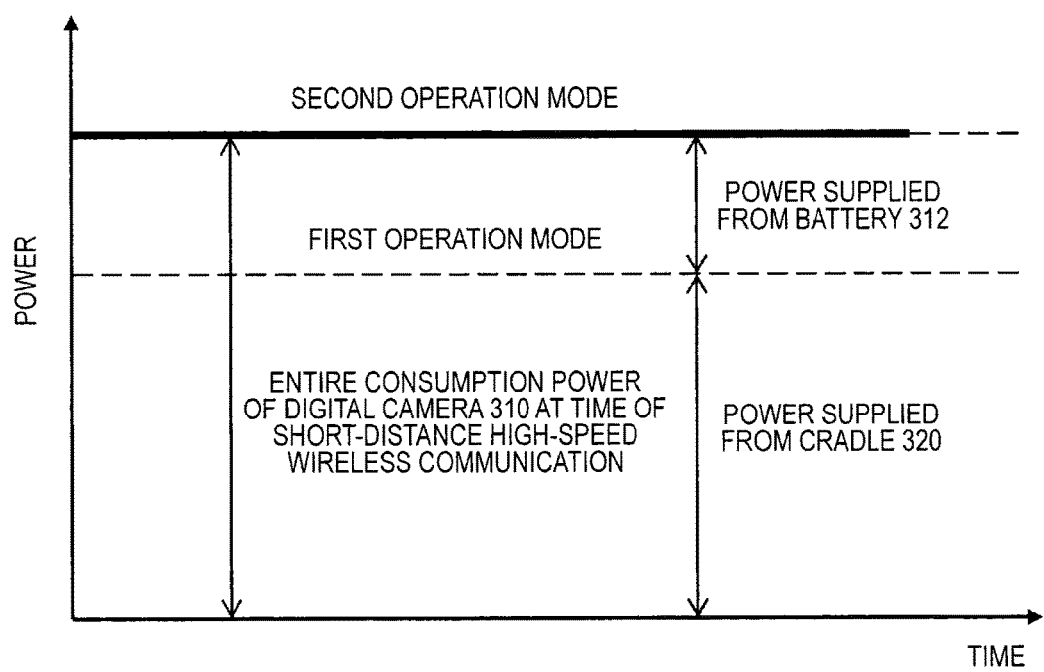
FIG. 5A is a diagram illustrating consumption power in the digital camera 310 when short-distance high-speed wireless communication is executed with a duty of 100%.

FIG. 5A illustrates consumption power in the digital camera 310 when the short-distance high-speed wireless communication is executed with a duty of 100%. Here, the duty of 100% means that data is actually transmitted in an entire section of a time in which the short-distance high-speed wireless communication is enabled. As illustrated in the drawing, in addition to the external power supplied from the cradle 320 by the contactless communication, discharging power from the battery 312 is supplied to the individual units 313 to 315.

Meanwhile, in the second operation mode, the performance of the communication operation in the short-distance communication control unit 313 can be upgraded, but power is consumed to the capacity of the battery 312. In other words, in the second operation mode, the charging of the battery 312 cannot be executed and the processing unit 113 cannot continuously execute the apparatus operation in the second operation mode in a state in which the remaining capacity of the battery 312 is small.

Figure 5B:
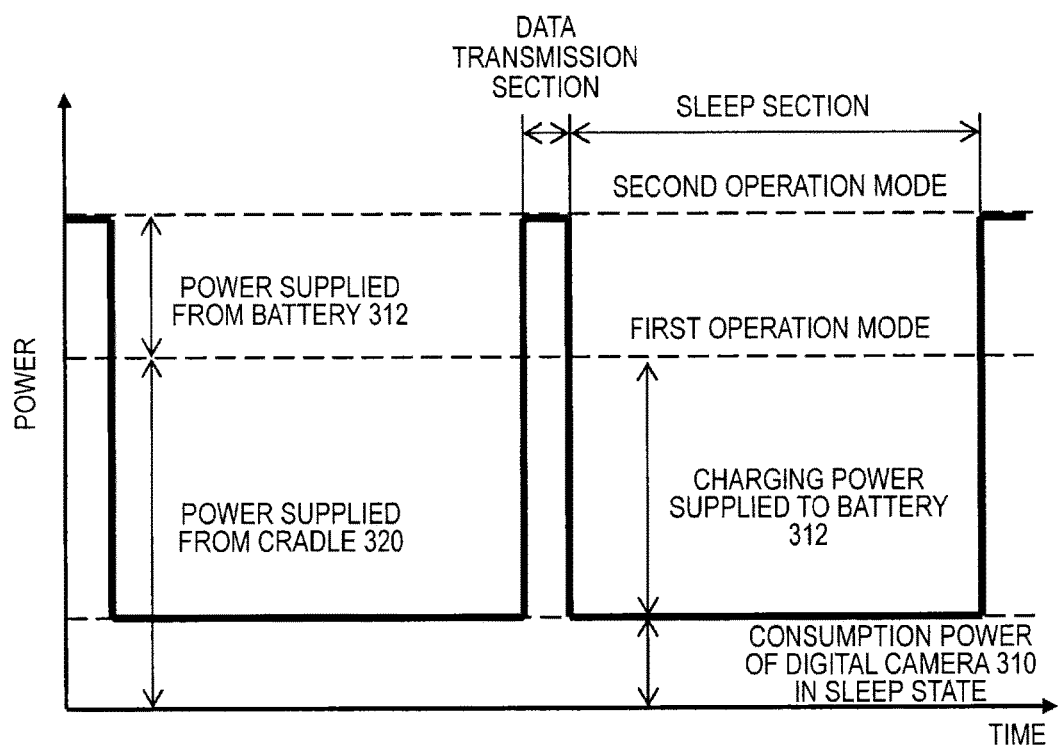
FIG. 5B is a diagram illustrating consumption power in the digital camera 310 when short-distance high-speed wireless communication is executed with a duty of 10%.

FIG. 5B illustrates consumption power in the digital camera 310 when the short-distance high-speed wireless communication is executed with a duty of 10%. Here, the duty of 10% means that data is actually transmitted in only a section of 10% of a time in which the short-distance high-speed wireless communication is enabled and the data is not transmitted and a sleep state (state in which consumption power is small) is maintained in the remaining section of 90%, and consumed power decreases. As illustrated in the drawing, in a section in which the operation of the short-distance high-speed wireless communication is stopped, the external power supplied from the cradle 320 by the contactless communication is charged in the battery 312.

When the remaining capacity of the battery 312 is sufficient, the control unit 315 operates the short-distance communication control unit 313 in the second operation mode. However, when the remaining capacity of the battery 312 decreases, the control unit 315 switches the operation mode of the short-distance communication control unit 313 into the first operation mode and continuously executes the short-distance high-speed wireless communication operation while suppressing the performance. At the same time, the control unit 315 executes the charging of the battery 312 and restores the remaining capacity.

Therefore, even though the maximum current standard of the external power from the cradle 320 is suppressed low, the digital camera 310 can efficiently execute the charging of the battery 312 while continuously executing the short-distance high-speed wireless communication operation. In addition, when the remaining capacity of the battery 312 is sufficient, the digital camera 310 can execute the short-distance high-speed wireless communication operation in which power is insufficient when only the external power from the cradle 320 is used, by additionally using the discharging power from the battery 112.

Figure 6:
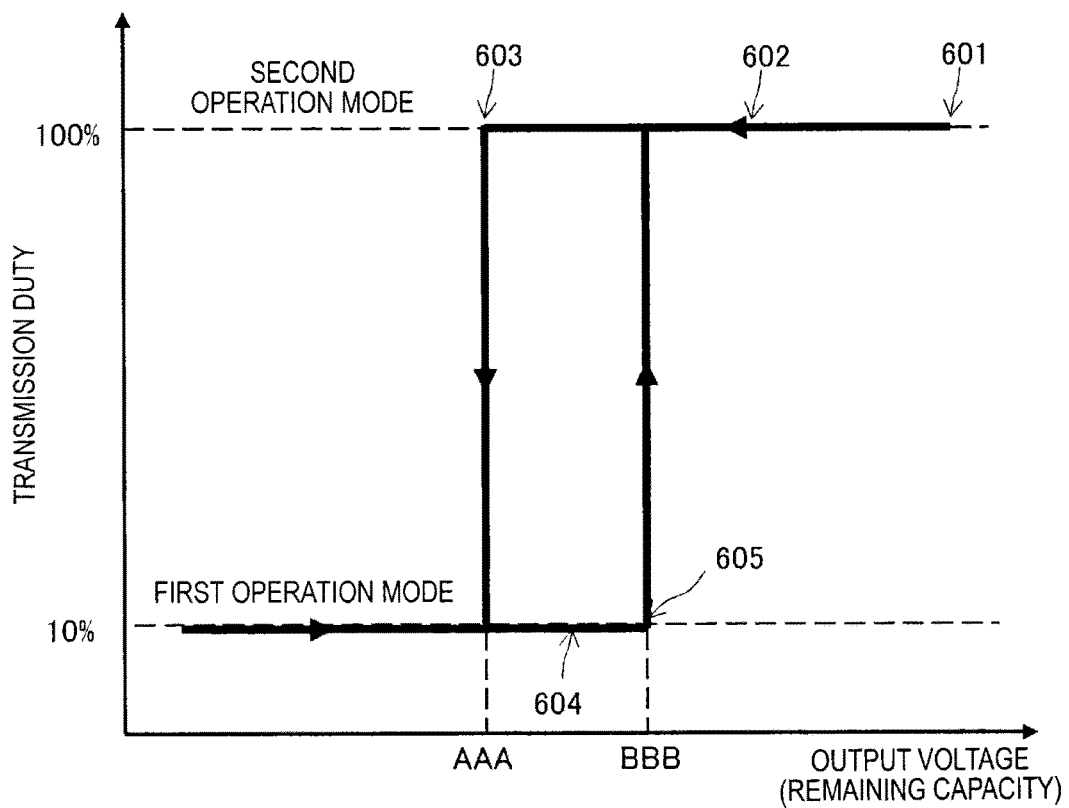
FIG. 6 is a diagram illustrating a charging/discharging characteristic of a battery 312 when an operation mode of a short-distance communication control unit 313 is switched according to the remaining capacity of the battery 312 and an apparatus operation is executed.

FIG. 6 illustrates a charging/discharging characteristic of the battery 312 when the operation mode of the short-distance communication control unit 313 is switched according to the remaining capacity of the battery 312 and the apparatus operation is executed. However, it is assumed that the remaining capacity is measured on the basis of the output voltage of the battery 312.

In a state in which the battery 312 is almost fully charged and the output voltage is sufficiently high, the short-distance communication control unit 313 starts a communication operation with a high duty ratio, in the second operation mode (reference number 601).

In the second operation mode, the performance of the short-distance high-speed wireless communication is high, but the operation is executed by feeding from the battery 312 in addition to the external power from the cradle 320. For this reason, the remaining capacity of the battery 312 gradually decreases. As a result, the output voltage also decreases (reference number 602).

In the second operation mode, the charging of the battery 312 cannot be executed and the communication operation cannot be continuously executed in the second operation mode in a state in which the remaining capacity of the battery 312 is small. Therefore, if the output voltage of the battery 312 is less than the first threshold value AAA, the control unit 315 switches the operation mode of the short-distance communication control unit 313 from the second operation mode to the first operation mode (reference number 603).

In the first operation mode, the performance of the communication operation of the short-distance communication control unit 313 is suppressed to decrease consumption power. Because the charging of the battery 312 is executed by the surplus power obtained by subtracting the power consumed by the individual units 313 to 315 from the external power from the cradle 320, the remaining capacity of the battery 312 gradually increases. As a result, the output voltage also increases (reference number 604).

In addition, if the output voltage of the battery 312 is more than the second threshold value BBB, it can be known that the remaining capacity has been sufficiently restored. Therefore, the control unit 315 returns the operation mode of the short-distance communication control unit 313 to the second operation mode and executes the communication operation with the original high performance (reference number 605). When the short-distance communication control unit 313 changes the operation mode to the second operation mode, supplying of the charging current of the battery 312 is also stopped.

In an example illustrated in FIG. 6, similarly to FIG. 2, the first threshold value AAA when the short-distance communication control unit 313 changes the operation mode from the second operation mode to the first operation mode is smaller than the second threshold value BBB when the short-distance communication control unit 313 changes the operation mode from the first operation mode to the second operation mode (AAA<BBB). The reason why the first threshold value AAA and the second threshold value BBB are set differently and hysteresis characteristics are generated as illustrated in the drawing is to prevent the operation from becoming unstable due to switching of the operation mode of the short-distance communication control unit 313 generated frequently by the measurement error of the output voltage of the battery 312.

Figure 7A:
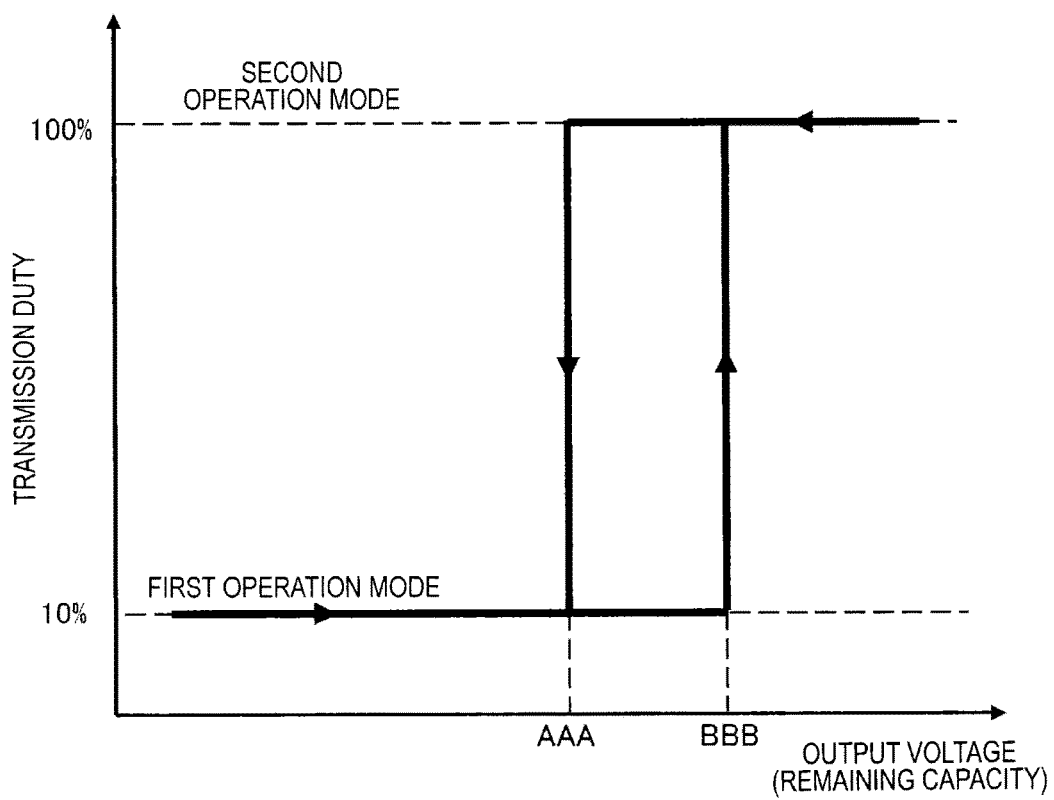
FIG. 7A is a diagram illustrating a charging/discharging characteristic of the battery 312 when an operation mode of the short-distance communication control unit 313 is switched according to the remaining capacity of the battery 312 and an apparatus operation is executed (when an amount of transmitted data is large and a threshold value is increased).
Figure 7B:
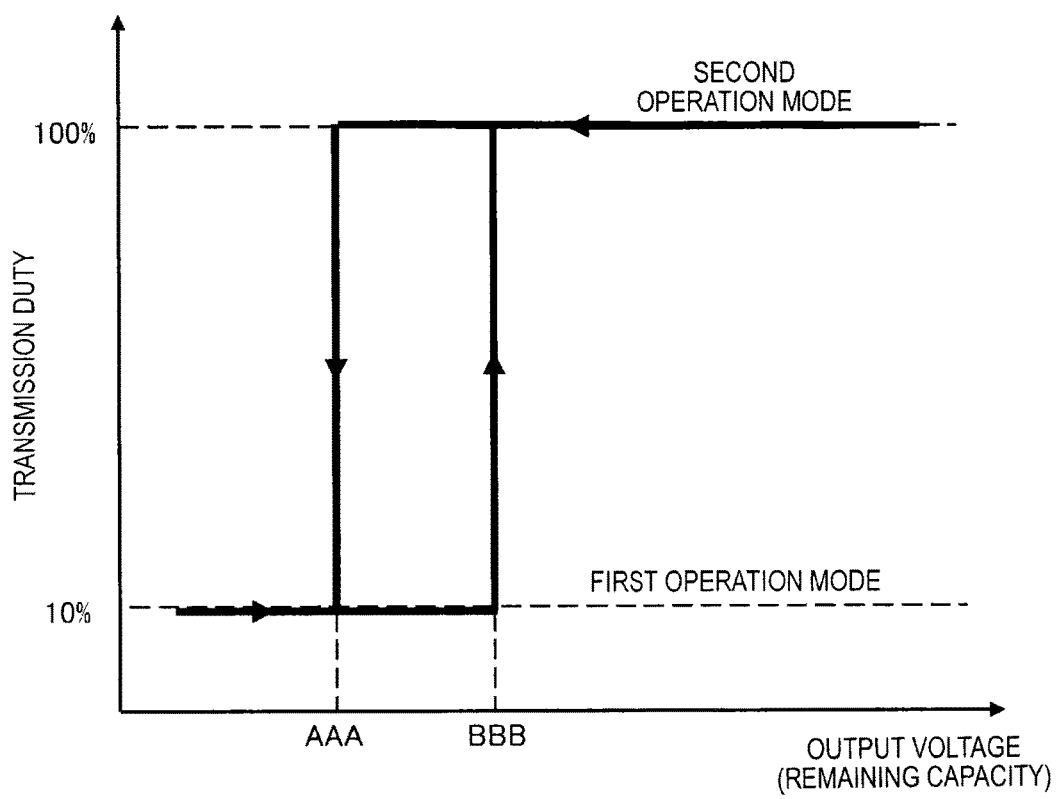
FIG. 7B is a diagram illustrating a charging/discharging characteristic of the battery 312 when an operation mode of the short-distance communication control unit 313 is switched according to the remaining capacity of the battery 312 and an apparatus operation is executed (when an amount of transmitted data is small and a threshold value is decreased).

The setting of the first threshold value AAA and the second threshold value BBB may be changed according to an amount of transmitted data by the short-distance high-speed wireless communication. For example, when the amount of transmitted data is large, as illustrated in FIG. 7A, the first threshold value AAA and the second threshold value BBB are increased and a region where the short-distance high-speed wireless communication is executed with the duty of 100% is decreased. Thereby, the remaining capacity of the battery 312 is maintained high at all times while transmission of a large amount of data is executed over a long time. In contrast, when the amount of transmitted data is small, as illustrated in FIG. 7B, the first threshold value AAA and the second threshold value BBB are decreased and the region where the short-distance high-speed wireless communication is executed with the duty of 100% is increased. Thereby, the data transmission is completed in a short period and the charging of the battery 312 can be immediately started.

Figure 8:
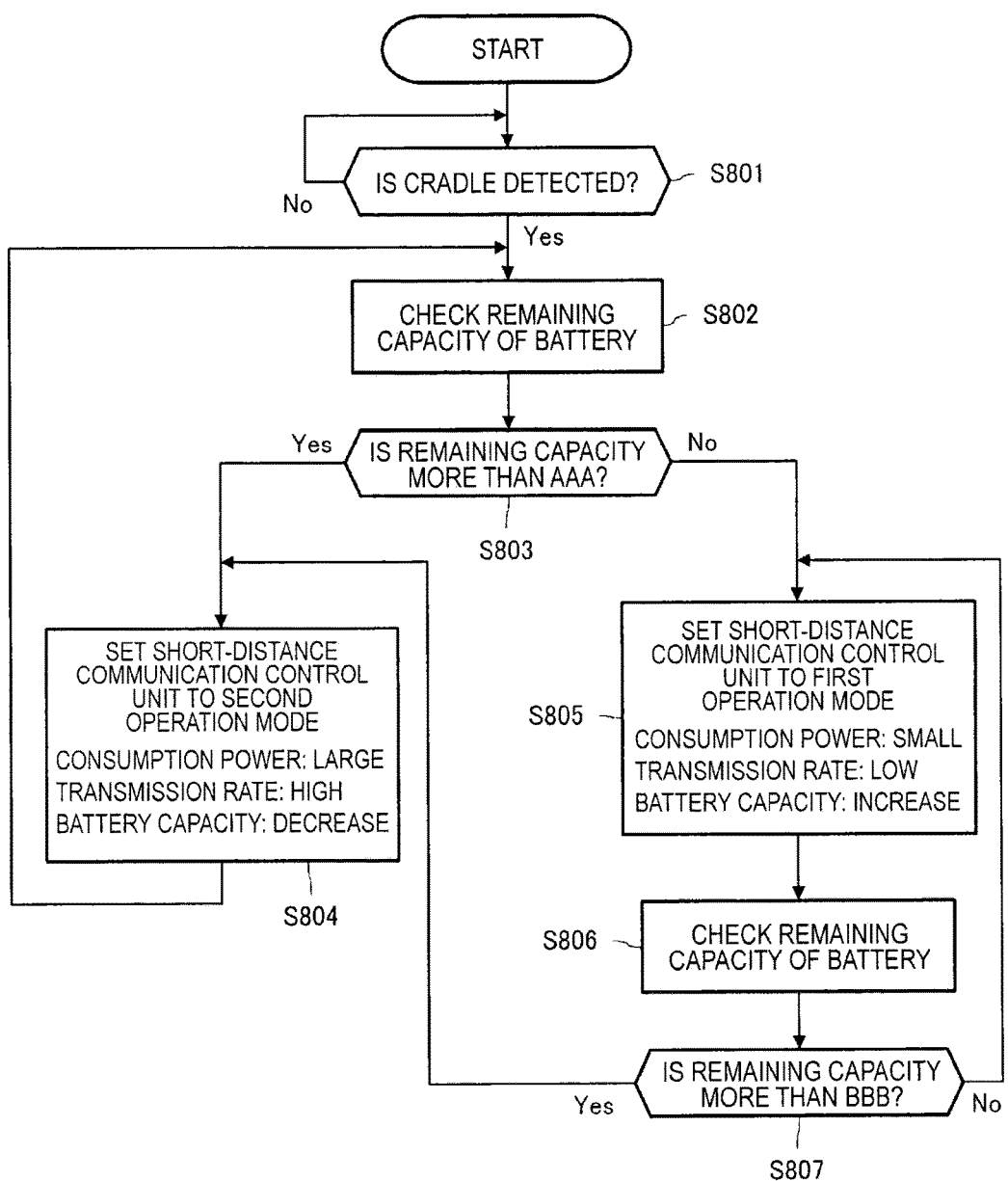
FIG. 8 is a flowchart illustrating a processing sequence when the digital camera 310 executes short-distance high-speed wireless communication.

FIG. 8 illustrates a processing sequence when the digital camera 310 executes the short-distance high-speed wireless communication in a form of a flowchart. The processing sequence can be realized in a form of executing a predetermined program/code in the control unit 315.

If the digital camera 310 is arranged on the cradle 320, the cradle 320 is detected by detecting the feeding power in the charging/discharging control unit 311 (Yes of step S801).

Next, the control unit 315 checks the remaining capacity of the battery 312 from the output voltage of the battery 312 (step S802).

Here, when it has been known that the output voltage of the battery 312 is more than the first threshold value AAA (Yes of step S803), the control unit 315 sets the operation mode of the short-distance communication control unit 313 to the second operation mode (step S804).

In the second operation mode, the short-distance communication control unit 313 executes the short-distance high-speed wireless communication with the duty of 100%. A transmission rate between the digital camera 310 and the cradle 320 increases. However, consumption power increases and the increased consumption power is complemented by feeding from the battery 312. For this reason, the remaining capacity of the battery 312 decreases and the output voltage decreases. Then, the process returns to step S802 and the remaining capacity of the battery 312 is checked again.

Meanwhile, when it has been known that the output voltage of the battery 312 is less than the first threshold value AAA (No of step S803), the control unit 315 sets the operation mode of the short-distance communication control unit 313 to the first operation mode (step S805).

In the first operation mode, the short-distance communication control unit 313 executes the short-distance high-speed wireless communication with the duty of 10%. The transmission rate between the digital camera 310 and the cradle 320 decreases. However, the consumption power decreases. For this reason, the battery 312 can be charged using the surplus power of the external power from the cradle 320. As a result, the remaining capacity of the battery 312 increases and the output voltage becomes high.

In addition, the remaining capacity of the battery 312 is checked again (step S806).

Here, when it has been known that the output voltage of the battery 312 becomes more than the second threshold value BBB (Yes of step S807), the control unit 315 sets the operation mode of the short-distance communication control unit 313 to the second operation mode (step S804).

In the second operation mode, the short-distance communication control unit 313 executes the short-distance high-speed wireless communication with the duty of 100%. The transmission rate between the digital camera 310 and the cradle 320 increases. However, the consumption power increases and the increased consumption power is complemented by feeding from the battery 312. For this reason, the remaining capacity of the battery 312 decreases and the output voltage decreases. Then, the process returns to step S802 and the remaining capacity of the battery 312 is checked again (the same as the above).

Meanwhile, when it has been known that the output voltage of the battery 312 is less than the second threshold value BBB (No of step S807), the control unit 315 maintains the operation mode of the short-distance communication control unit 313 at the set second operation mode (step S805). Therefore, the short-distance communication control unit 313 continuously executes the short-distance high-speed wireless communication with the duty of 10%. The transmission rate between the digital camera 310 and the cradle 320 is maintained low. However, because the battery 312 is continuously charged using the surplus power of the external power from the cradle 320, the remaining capacity of the battery 312 further increases and the output voltage becomes high.

The digital camera 310 executes the data transmission operation according to the processing sequence illustrated in FIG. 8, so that the digital camera 310 can execute data transmission with the cradle 320 by the short-distance high-speed wireless communication while maintaining charging efficiency of the battery, even in a state in which the remaining capacity of the battery has decreased. In addition, the digital camera 310 can execute the short-distance high-speed wireless communication at the high duty in which power is insufficient when only the external power supplied from the cradle 320 is used, by using the discharging power from the battery.

In addition, the technology disclosed in the present specification can take the following configurations.

(1) An electronic apparatus including:
a battery;
a processing unit that executes an apparatus operation; and
a charging/discharging control unit that controls feeding to the processing unit and charging of the battery using external power and feeding from the battery to the processing unit,
wherein the processing unit has a first operation mode in which the apparatus operation is executed using power equal to or less than the external power and a second operation mode in which the apparatus operation is executed using power more than the external power, an operation mode of the processing unit is switched into the first operation mode or the second operation mode according to the remaining capacity of the battery, and the apparatus operation is executed.

(2) The electronic apparatus according to (1),
wherein the charging/discharging control unit supplies the external power preferentially to the processing unit and executes the charging of the battery using surplus power.

(3) The electronic apparatus according to (1),
wherein, when the processing unit executes the apparatus operation in the first operation mode, the charging/discharging control unit executes the charging of the battery using surplus power of the external power consumed by the processing unit.

(4) The electronic apparatus according to (1),
wherein, when the processing unit executes the apparatus operation in the second operation mode, the charging/discharging control unit supplies the power more than the external power from the battery to the processing unit.

(5) The electronic apparatus according to (1),
wherein, when the remaining capacity of the battery is large, the processing unit executes the apparatus operation in the second operation mode, and when the remaining capacity of the battery is small, the processing unit executes the apparatus operation in the first operation mode.

(6) The electronic apparatus according to (1),
wherein, when the remaining capacity of the battery becomes a first threshold value or less while the processing unit executes the apparatus operation in the second operation mode, the operation mode changes to the first operation mode and the charging of the battery is executed using surplus power of the external power, and
when the remaining capacity of the battery becomes equal to or more than a second threshold value more than the first threshold value while the processing unit executes the apparatus operation in the first operation mode, the operation mode changes to the second operation mode.

(7) The electronic apparatus according to (1),
wherein the electronic apparatus is a digital camera or other portable apparatus and the external power is supplied from a cradle USB-connected to a USB host.

(8) The electronic apparatus according to (1),
wherein the processing unit executes communication with a communication partner other than the apparatus using short-distance high-speed wireless communication of a weak UWB method.

(9) The electronic apparatus according to (8),
wherein the processing unit sets a duty of a section, in which data transmission is actually executed in a time in which the short-distance high-speed wireless communication is enabled, to be low in the first operation mode and sets the duty to be higher than the duty of the first operation mode in the second operation mode.

(10) A charging control method including:
a remaining capacity detection step of detecting the remaining capacity of a battery in an electronic apparatus to which external power is supplied;
a second apparatus operation step of executing an apparatus operation by a second operation mode in which power more than the external power is consumed, using the external power and discharging power of the battery in the electronic apparatus, when the remaining capacity of the battery is equal to or more than a first threshold value; and
a first apparatus operation step of executing an apparatus operation by a first operation mode in which power equal to or less than the external power is consumed, in the electronic apparatus, when the remaining capacity of the battery is less than the first threshold value.

(11) The charging control method according to (10), further including:

a charging step of charging the battery using surplus power of the external power, when the apparatus operation by the first operation mode is executed in the electronic apparatus; and an operation mode change step of switching the apparatus operation of the electronic apparatus into the second operation mode, in response to that the remaining capacity of the battery has become a second threshold value or more while the apparatus operation by the first operation mode is executed in the electronic apparatus.

(12) A charging system including:

an electronic apparatus; and a feeding device that supplies power to the electronic apparatus, wherein the electronic apparatus includes a battery and a processing unit having a first operation mode in which an apparatus operation is executed using power equal to or less than external power supplied from the feeding device and a second operation mode in which the apparatus operation consuming power more than the external power is executed and the electronic apparatus switches an operation mode of the processing unit into the first operation mode or the second operation mode according to the remaining capacity of the battery and executes the apparatus operation.

(13) A data transmission system including:

an electronic apparatus; and a cradle on which the electronic apparatus is arranged and which is USB-connected, wherein the cradle transmits power obtained via a USB cable to the electronic apparatus by contactless communication, and the electronic apparatus includes a battery and a short-distance communication control unit having a first operation mode in which a data transmission operation of a low duty is executed using power equal to or less than external power supplied from the cradle and a second operation mode in which power more than the external power is consumed and the data transmission operation of a high duty is executed and the electronic apparatus switches an operation mode of the processing unit into the first operation mode or the second operation mode according to the remaining capacity of the battery and executes a short-distance high-speed wireless communication operation.

INDUSTRIAL APPLICABILITY

The technology disclosed in the present specification has been described in detail with reference to the specific embodiments. However, it is apparent that those skilled in the art may find modifications and alternations of the embodiments without departing from the scope of the technology disclosed in the present specification.

In the present specification, the embodiments applied to the system in which the digital camera executes the contactless communication using the cradle USB-connected to the personal computer and the battery in the digital camera is charged have been described mainly. However, the technology for executing the charging at the same time as the apparatus operation can be applied to a variety of other electronic apparatuses driven by the battery. For example, the technology disclosed in the present specification can be equally applied to a variety of electronic apparatuses using the battery such as a notebook computer, a mobile phone, a portable music reproduction apparatus, an automobile, a railroad vehicle, a ship, an airplane, an artificial satellite, a robot, a house, lighting equipment, a medical apparatus, a measuring instrument, a machine tool, a television, a radio, a transceiver, and an emergency power supply.

In short, the technology disclosed in the present specification is described in an exemplary form and thus, it should be noted that content described in the present specification is not analyzed to be limited. To determine the scope of the technology disclosed in the present specification, it is necessary to take claims into consideration.

REFERENCE SIGNS LIST

100 Data transmission system
110 Electronic apparatus
111 Charging/discharging control unit
112 Battery
113 Processing unit
120 Feeding device
300 Data transmission system
310 Digital camera
311 Charging/discharging control unit
312 Battery
313 Short-distance communication control unit
314 Contactless communication control unit
315 Control unit
320 Cradle
321 USB interface
322 Contactless communication control unit
323 Short-distance communication control unit
330 Personal computer
331 USB cable
332 USB power supply unit
333 USB data unit

The invention claimed is:

1. An electronic apparatus, comprising:
a battery;
a processing unit; and
a charging/discharging control unit configured to:
  determine an output voltage of the battery;
  control a first electric feed to the processing unit based on an external electric power supplied by a feeding device;
  supply of electric charge to the battery based on the external electric power; and
  control a second electric feed from the battery to the processing unit, wherein the processing unit is configured to:
  execute an operation of the electronic apparatus in a first mode, based on the determined output voltage of the battery and a first electric power,
    wherein the first electric power is one of less than the external electric power supplied by the feeding device or equal to the external electric power supplied by the feeding device;
  execute the operation of the electronic apparatus in a second mode, based on the determined output voltage of the battery and a second electric power that is more than the external electric power;
  set a first threshold value, based on an amount of data associated with the execution of the operation of the electronic apparatus in one of the first mode or the second mode;

set a second threshold value, based on the amount of data associated with the execution of the operation of the electronic apparatus in one of the first mode or the second mode;

switch the operation of the electronic apparatus from:
the first mode to the second mode based on the determined output voltage of the battery that is higher than the set first threshold value, and
the second mode to the first mode based on the determined output voltage of the battery that is lower than the set second threshold value,
wherein the set second threshold value is less than the set first threshold value; and control at least one functional module of the electronic apparatus based on the execution of the operation of the electronic apparatus in one of the first mode or the second mode.

2. The electronic apparatus according to claim 1, wherein, in the first mode, the charging/discharging control unit is further configured to control, based on a third electric power, the supply of the electric charge to the battery, and
wherein the third electric power is calculated based on subtraction of the first electric power and the external electric power.

3. The electronic apparatus according to claim 1, wherein, in the second mode, the charging/discharging control unit is further configured to supply the second electric power that is more than the external electric power from the battery to the processing unit.

4. The electronic apparatus according to claim 1, wherein the charging/discharging control unit is further configured to:
control the supply of the electric charge to the battery based on a third electric power of the external electric power;
execute the operation of the electronic apparatus in the first mode based on the controlled supply of the electric charge; and
suspend the supply of the electric charge to the battery in the second mode.

5. The electronic apparatus according to claim 1,
wherein the electronic apparatus is one of a digital camera or a portable apparatus,
wherein the feeding device is a USB host device, and
wherein the external electric power is supplied from a cradle USB-connected to the USB host device.

6. The electronic apparatus according to claim 1, wherein the processing unit is further configured to control a communication partner device to communicate, based on a short-distance high-speed wireless communication of a weak UWB method.

7. The electronic apparatus according to claim 6, wherein the processing unit is further configured to:
set, a first duty for a first time period, as low, in the first mode; and
set, a second duty for the first time period as higher than the first duty, in the second mode of the operation,
wherein the short-distance high-speed wireless communication is enabled for data transmission in the first time period.

8. A charging control method, comprising:
determining an output voltage of a battery in an electronic apparatus;
detecting remaining capacity of the battery in the electronic apparatus based on the determined output voltage of the battery;
controlling charging of the battery based on an external electric power supplied by a feeding device;
executing an operation of the electronic apparatus in a first mode, based on the determined output voltage of the battery and a first electric power,
wherein the first electric power is one of less than the external electric power or equal to the external electric power;
executing the operation of the electronic apparatus in a second mode, based on the determined output voltage of the battery and a second electric power that is more than the external electric power;
setting a first threshold value, based on an amount of data associated with the execution of the operation of the electronic apparatus in one of the first mode or the second mode;
setting a second threshold value, based on the amount of data associated with the execution of the operation of the electronic apparatus in one of the first mode or the second mode;
switching the operation from:
the first mode to the second mode based on the determined output voltage of the battery that is higher than the set first threshold value, and
the second mode into the first mode based on the determined output voltage of the battery that is lower than the set second threshold value,
wherein the set second threshold value is less than the set first threshold value; and
controlling at least one functional module of the electronic apparatus based on the execution of the operation of the electronic apparatus in one of the first mode or the second mode.

9. The charging control method according to claim 8, further comprising:
charging the battery based on a third electric power of the external electric power in the first mode of the operation of the electronic apparatus; and
suspending the charging of the battery in the second mode of the operation of the electronic apparatus.

10. A charging system, comprising:
an electronic apparatus; and
a feeding device that is configured to supply an external electric power to the electronic apparatus,
wherein the electronic apparatus includes:
a battery;
a charging/discharging control unit configured to determine an output voltage of the battery; and
a processing unit configured to:
execute an operation of the electronic apparatus in a first mode, based on the determined output voltage of the battery and a first electric power,
wherein the first electric power is one of less than the external electric power supplied from the feeding device or equal to the external electric power supplied from the feeding device;
execute the operation of the electronic apparatus in a second mode, based on the determined output voltage of the battery and a second electric power that is more than the external electric power supplied from the feeding device;
set a first threshold value, based on an amount of data associated with the execution of the operation of the electronic apparatus in one of the first mode or the second mode;

set a second threshold value, based on the amount of data associated with the execution of the operation of the electronic apparatus in one of the first mode or the second mode;

switch the operation of the processing unit from:
the first mode to the second mode based on the determined output voltage of the battery that is higher than the set first threshold value, and
the second mode to the first mode based on the determined output voltage of the battery that is lower than the set second threshold value,
wherein the set second threshold value is less than the set first threshold value; and control at least one functional module of the electronic apparatus based on the execution of the operation of the electronic apparatus in one of the first mode or the second mode.

11. A data transmission system, comprising:
an electronic apparatus; and
a cradle configured to hold the electronic apparatus, wherein:
the cradle is configured to transmit an external electric power to the electronic apparatus by a contactless communication, and
the electronic apparatus includes:
a battery;
a charging/discharging control unit configured to determine an output voltage of the battery; and
a short-distance communication control unit configured to:
execute an operation of the electronic apparatus in a first mode in which a data transmission operation of a low duty is executed, based on the determined output voltage of the battery and a first electric power that is less than the external electric power supplied from the cradle;
execute the operation of the electronic apparatus in a second mode, based on determined output voltage and consumption of a second electric power that is more than the external electric power supplied from the cradle,
wherein the data transmission operation of a high duty is executed in the second mode;
set a first threshold value, based on an amount of data associated with the execution of the operation of the electronic apparatus in one of the first mode or the second mode;
set a second threshold value, based on the amount of data associated with the execution of the operation of the electronic apparatus in one of the first mode or the second mode;
switch the operation of the short-distance communication control unit from:
the first mode to the second mode based on the determined output voltage of the battery that is higher than the set first threshold value;
the second mode to the first mode based on the determined output voltage of the battery that is lower than the set second threshold value,
wherein the set second threshold value is less than the set first threshold value; and
control at least one functional module of the electronic apparatus based on the execution of the operation of the electronic apparatus in one of the first mode or the second mode.

* * * * *